(12) United States Patent
Preden et al.

(10) Patent No.: US 8,624,729 B2
(45) Date of Patent: Jan. 7, 2014

(54) MONITORING METHOD, A MONITORING SYSTEM AND A SENSOR STATION

(75) Inventors: Jürgo-Sören Preden, Tallinn (EE); Jaanus Tamm, Tallinn (ES); Madis Uusjärv, Tallinn (EE); Villu Arulaane, Tallinn (EE)

(73) Assignee: Defendec Inc., Tallinn (EE)

( * ) Notice: Subject to any disclaimer, the term of this patent is extended or adjusted under 35 U.S.C. 154(b) by 106 days.

(21) Appl. No.: 13/496,334

(22) PCT Filed: Sep. 16, 2010

(86) PCT No.: PCT/IB2010/054182
§ 371 (c)(1),
(2), (4) Date: Mar. 28, 2012

(87) PCT Pub. No.: WO2011/033466
PCT Pub. Date: Mar. 24, 2011

(65) Prior Publication Data
US 2012/0176239 A1    Jul. 12, 2012

(30) Foreign Application Priority Data
Sep. 17, 2009   (EE) ................................ 200900090 U

(51) Int. Cl.
*G08B 1/08*    (2006.01)
*G08B 29/00*    (2006.01)
*H04L 12/28*    (2006.01)

(52) U.S. Cl.
USPC .............. 340/539.17; 340/539.1; 340/539.19; 340/539.22; 340/505; 340/506; 340/522; 370/254

(58) Field of Classification Search
USPC .................................................... 340/539.17
See application file for complete search history.

(56) References Cited

U.S. PATENT DOCUMENTS

| | | | |
|---|---|---|---|
| 6,208,247 | B1 | 3/2001 | Agre et al. |
| 7,019,637 | B1 | 3/2006 | Johnson et al. |
| 8,045,482 | B2 * | 10/2011 | Davis et al. .................. 370/254 |
| 2006/0293793 | A1 | 12/2006 | Tamura |
| 2007/0150565 | A1 | 6/2007 | Ayyagari et al. |

OTHER PUBLICATIONS

International Preliminary Report on Patentability; International Patent Application No. PCT/IB2010/054182; Dec. 27, 2011.
International Search Report; International Patent Application No. PCT/IB2010/054182; Dec. 22, 2010.

* cited by examiner

*Primary Examiner* — Donnie Crosland
(74) *Attorney, Agent, or Firm* — Barnes & Thornburg LLP

(57) ABSTRACT

A monitoring system having an ad-hoc network of wireless sensor stations. Each sensor station is provided with one or more sensors suitable for monitoring one or more physical parameters of interest and collecting information. The sensor stations are configured to process the collected information using appropriate distributed computational algorithms such that nearby sensor stations can exchange information with each other in the ad-hoc network to evaluate the situation in a specific location at a specific moment in time employing combined information of the nearby sensor stations in the area. The information is transmitted via the ad-hoc network to information consumers only if necessary, based on the evaluation.

13 Claims, 2 Drawing Sheets

MONITORING METHOD, A MONITORING SYSTEM AND A SENSOR STATION

PRIORITY CLAIM

This patent application is a U.S. National Phase of International Patent Application No. PCT/IB2010/054182, filed 16 Sep. 2010, which claims priority to Estonian Patent Application No. U200900090, filed 17 Sep. 2009, the disclosures of which are incorporated herein by reference in their entirety.

FIELD

Disclosed embodiments relate to monitoring and security systems, and particularly to methods and systems for the monitoring of a territory or infrastructure and the monitoring of its perimeter and detection of intruders, that can be used for monitoring large areas or many different objects.

BACKGROUND

Sensor networks have many applications, for example in security systems, environmental and industrial monitoring, military and biomedical applications. In many of these applications it is not possible to connect sensors using wires, for which reason the use of wireless sensor networks may be used.

The monitoring and detection of vehicles, humans and other similar objects is a complicated task since reliable identification and monitoring requires a high number of sensors placed in each other's proximity. For this reason arises a demand for a wireless sensor network, which consists of cheap sensors with low energy requirements.

In U.S. Pat. No. 6,208,247 compact wireless sensor stations are described, which can be connected to a network with other similar sensor stations and enable the measurement and analysis of vibration, infrared emission, sound or other signals specific to an intruder or a specific condition of the environment. Such sensor stations are embedded computers with low energy requirements and are equipped with at least one sensor, a microcontroller, wireless communication interface and an appropriate energy source. The network is formed using multi-hop ad-hoc networking principles, where the sensor stations also operate as routers and sensor stations can join and leave the network at runtime. Such sensor stations can be placed in selected locations manually or from vehicles, including deployment from aerial and water vehicles. The sensor stations are programmed to organize into a network that employs decentralized control, meaning that there is no requirement for a central control centre.

In U.S. Pat. No. 6,208,247 the sensor stations contain at least one appropriate sensor, by means of which analog signals are converted to digital signals and which selected power spectrum is compared to a sample spectrum stored in the sensor station (which may mean the existence or not existence of an alarm). As a result of the comparison the sensor station makes an appropriate decision—takes no action, wakes up the processor from the energy saving mode and executes an additional signal processing step; starts the communication module and forwards the spectrum, forwarding the unprocessed signal. The sensor stations can be reprogrammed if required, for example new sample spectrums could be loaded to the sensor station or the sensor stations could be programmed for a longer period of activity. For communication with other sensor stations a short range multihop TDMA communication scheme is used which allows reducing energy consumption and using a small number of channels for communication. The addition and removal of sensor stations is performed easily and automatically.

The described prior art solution has a range of shortcomings. One of the most critical aspects of wireless sensor networks is the energy consumption, most of the energy being consumed by the communication interface and the microcontroller. The prior art solution assumes that the sensor stations are constantly able to receive messages from nearby sensor stations which means that the sensor stations are constantly in a mode where they consume a substantial amount of power. The decisions are made in each sensor station based on the sensor readings of the sensor station, which means that in case of each alarm the data is forwarded, not taking into consideration the sensor readings acquired by other similar or dissimilar sensor stations, which potentially may increase the number of false alarms and also the amount of data sent out by the sensor stations and the amount of energy consumed by the network. Similarly the solution is designed to communicate the information to a central location, regardless if it was a false alarm or not. If the alarm was detected by several sensor stations the information is sent out to a central location autonomously by all such sensor stations.

SUMMARY

One disclosed embodiment provides is a method of monitoring an area, comprising setting up an ad-hoc network of wireless sensor stations, wherein at least some of the sensor stations comprise one or more sensors suitable for monitoring one or more physical parameters of interest, the sensor stations collecting information using the sensors; the sensor stations processing the collected information using appropriate distributed computational algorithms such that at least two nearby sensor stations exchange information with each other in the ad-hoc network to evaluate the situation in a specific location at a specific moment in time employing combined information of the at least two nearby sensor stations in the area; and transmitting, if required based on the evaluation, information on the situation via the ad-hoc network to information consumers.

A second disclosed embodiment provides a system for monitoring an area, comprising means for implementing the method according to any one of the disclosed embodiments.

A third disclosed embodiment provides a sensor station comprising one or more sensors suitable for monitoring one or more physical parameters of interest, a wireless communication module, a computing unit, and a memory for storing data, the sensor station being configured to implement the method according to any one of the embodiments of the disclosed in collaboration with a plurality of other similar sensor stations.

BRIEF DESCRIPTION OF THE DRAWINGS

The disclosed embodiments will be described in greater detail with reference to the attached drawings, in which.

DETAILED DESCRIPTION OF THE DISCLOSED EMBODIMENTS

Figure 1:
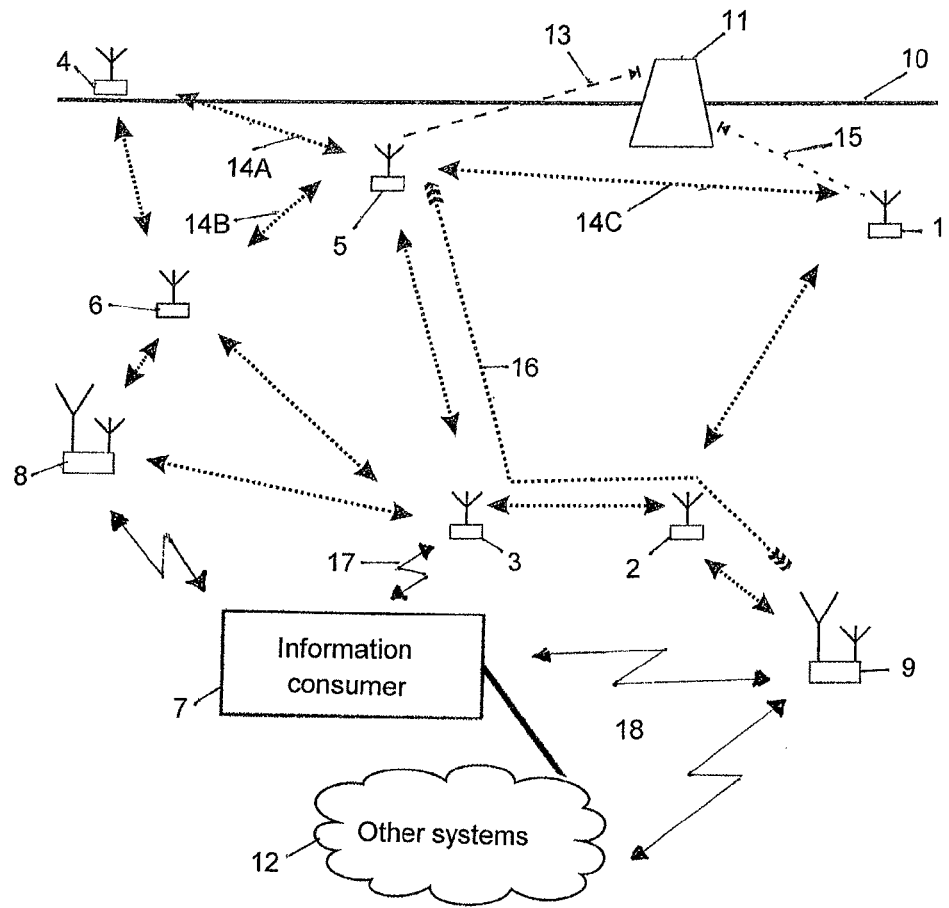
FIG. 1 illustrates an example of a monitoring system according to one disclosed embodiments.

One disclosed embodiment provides a method and an apparatus for implementing the method so as to overcome or alleviate one or more of the above problems.

This is achieved by a method, a system and a sensor station according to the independent claims. Further embodiments are disclosed in the dependent claims.

One disclosed embodiment provides is a method of monitoring an area, comprising setting up an ad-hoc network of wireless sensor stations, wherein at least some of the sensor stations comprise one or more sensors suitable for monitoring one or more physical parameters of interest, the sensor stations collecting information using the sensors; the sensor stations processing the collected information using appropriate distributed computational algorithms such that at least two nearby sensor stations exchange information with each other in the ad-hoc network to evaluate the situation in a specific location at a specific moment in time employing combined information of the at least two nearby sensor stations in the area; and transmitting, if required based on the evaluation, information on the situation via the ad-hoc network to information consumers.

According to one disclosed embodiment, at least one of the sensor stations is configured to inquire information and/or distributed processing from at least one other nearby sensor station in response to a predetermined triggering event.

According to another disclosed embodiment, at least one of the sensor stations is configured to send information and/or providing distributed processing to at least one other nearby sensor station in response to an inquiry or a predetermined triggering event.

According to a further disclosed embodiment, the roles of the sensor stations in the information collecting and the distributed processing are determined at runtime, depending on the availability of algorithms, the availability of processing power, the availability of energy, the properties of sensor stations, the requirements of the application, and/or requirements of other sensor stations.

According to an additional disclosed embodiment, a sensor station is configured to execute a specific distributed processing algorithm or a specific information collecting task in response to a specific request from another node.

According to yet another disclosed embodiment, the processing algorithms of a sensor station are updated during operation of the sensor station via the ad-hoc network.

According to another disclosed embodiment, only collaboratively processed information or decisions are transmitted to the information consumers outside the ad-hoc network.

According to a further disclosed embodiment, information is transmitted to the information consumers outside the ad-hoc network, when a decision to transmit information has been made by at least one of the sensor station as a result of evaluating information collected by at least two sensor stations.

According to an additional disclosed embodiment, information is transmitted to the information consumers, when a decision to transmit information has been made by more than one of the sensor stations, based on the information collected, processed and forwarded by the more than one sensor stations and possibly other sensor stations in the area.

According to yet another disclosed embodiment, the collected information is provided with spatial and temporal information at the sensor stations.

According to another disclosed embodiment, at least one sensor station is configured to query, process and analyze information collected and processed by at least one nearby sensor station, and to assess the situation in a certain area at a certain time employing information collected locally and information collected by other sensor stations, and to tag the queries and information with temporal and spatial information for monitoring and evaluating the source of the event in the location of sensors at various locations and with various modalities, and the sensor station is configured to evaluate the situation in a specific location at a specific moment in time, employing the information collected by the sensor station itself and by other sensor stations in the area.

According to a further disclosed embodiment, the information consumers include one or more of the following: a command centre, a patrol system, a security centre, a data processing centre, a mobile user terminal, a control room of a plant, a maintenance system of a plant.

A second disclosed embodiment provides a system for monitoring an area, comprising means for implementing the method according to any one of the disclosed embodiments.

A third disclosed embodiment provides a sensor station comprising one or more sensors suitable for monitoring one or more physical parameters of interest, a wireless communication module, a computing unit, and a memory for storing data, the sensor station being configured to implement the method according to any one of the disclosed embodiments in collaboration with a plurality of other similar sensor stations.

Disclosed embodiments use distributed sensor stations (e.g., embedded computers) equipped with sensors and a communication module, where the sensor stations are configured (e.g., programmed) to collect, process and transmit sensor data utilizing distributed computational models and algorithms. The data is exchanged between the sensor stations and information consumers, which could be for example a central data collection centre.

According to another disclosed embodiment, the sensor stations are configured to process the data acquired using the sensors interfaced to the sensor station.

According to a further disclosed embodiment, the sensor stations are configured to query, receive, process and analyze the information received from nearby sensor stations.

According to an additional disclosed embodiment, the sensor stations are equipped with algorithms that enable them to, using the information acquired from sensors interfaced to the sensor station or information received from other sensor stations, to assess the situation in a specific area at a specific time whereas the assessment of the situation can be in the form of parameters characterizing the situation.

According to yet another disclosed embodiment, the sensor stations are equipped with location information that can be determined and stored during the installation of the sensor station or the sensor station could be equipped with means of localization (for example a GPS received or a mobile positioning system), the sensor stations are also equipped with means for determining the time, enabling attachment of temporal and spatial information to the information sent from the sensor station and queries, which allow to evaluate and monitor the source of an alarm using sensors of different modalities and in different locations and form a complete view of the nature and movement of the source of the alarm.

According to another disclosed embodiment, the sensor stations are configured to store the information, including visual information, in the memory of the sensor station, and forward that information to the information consumers, for example a central data collection centre or other systems only when a decision to do so has been made by one or more sensor stations, based on the information collected, processed and forwarded by the given sensor station and other sensor stations in the area of the source of alarm.

According to a further disclosed embodiment, the sensor station is an embedded computer that contains low power sensor modules that could be equipped with sensors suitable for measuring one or more physical parameters (such as sound, light, acceleration, magnetic field, infrared and visible light, airborne chemicals), an autonomous power supply, a wireless communication interface, a microcontroller and memory for storing data. The sensor stations could be installed on ground or underground or on objects.

According to an additional disclosed embodiment, the network contains a module for transmitting the analyzed data to other information consumers that could be manned or unmanned vehicles, mobile user terminals, security patrols that are equipped with devices that enable communication with the system.

According to yet another embodiment, the network is configured in a way where data from the system is transmitted to other systems only when there is a need to do so. The decision for determining that is made based on the analysis of data collected with various sensors.

A distributed perimeter intrusion detection system, as well as other applications of monitoring systems, implemented according to disclosed embodiments is more cost effective and the installation of the system is easier. The system implemented according to disclosed embodiments further consumes less energy, has a longer lifetime, is more robust, produces fewer false alarms, is more intelligent and is suitable for monitoring large territories. The system is able to operate years in an outdoor environment without human intervention.

A simplified schematic example of a monitoring system according to one disclosed embodiment is illustrated in FIG. 1. A plurality of sensor stations 1, 2, 3, 4, 5 and 6 (any number of sensor stations may be employed) may be placed in close proximity and around the monitored asset, object, area or perimeter 10 (in various places or following a certain installation pattern). Such sensor stations can be placed in selected locations manually or from vehicles, including deployment from aerial and water vehicles. Referring to FIG. 1, the sensor stations 1-6 are configured to form a network of sensor stations, and to exchange configuration information about the network and measurement information on the monitored environment acquired by sensor stations. According to an embodiment, the sensor stations 1-6 may be configured (programmed) to organize themselves into a wireless network of sensor stations, such as an ad hoc network, that employs decentralized control, meaning that there may not be any requirement for a central control centre. The "ad hoc network" is a collection of wireless sensor stations that can dynamically be set up anywhere and anytime without using any pre-existing network infrastructure. The structure of an ad hoc network is not fixed but can change dynamically, i.e. sensor stations (nodes) 1-6 can be added to or removed from the ad hoc network while the ad hoc network is operational, without causing irreversible failures. Thus, the ad hoc network is able to reconfigure the flow of network traffic according to the current situation.

Figure 2:
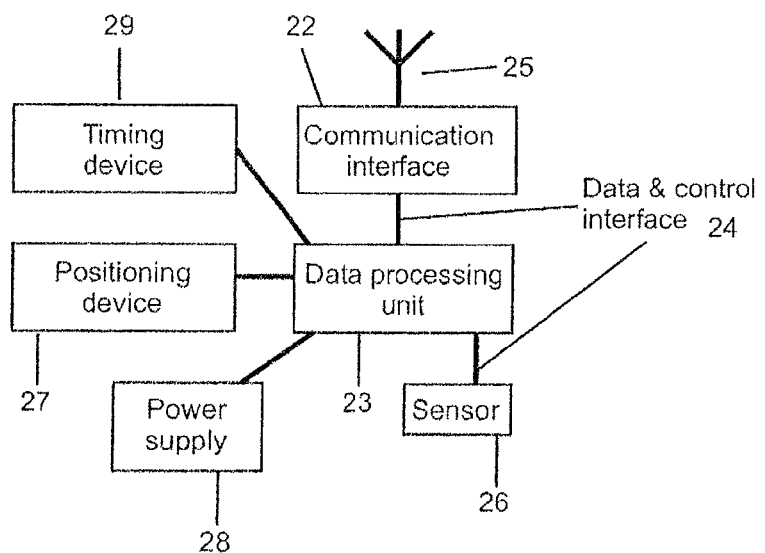
FIG. 2 illustrates a simplified schematic diagram of an exemplary sensor station.

A sensor station is an autonomous computing entity in a network. Generally, sensor stations may be small, embedded computers equipped with one or more sensors, a wireless communication interface and an autonomous power supply. According to another disclosed embodiment, the sensor station may be equipped with an energy harvesting device(s) that enables collecting energy from the environment, for example a solar panel. A simplified schematic diagram of an exemplary sensor station is illustrated in FIG. 2. A sensor station may be provided with a communication interface 22 (such as wireless communication means, e.g. radio part with a transmitter, a receiver, and an antenna 25), a data processing unit 23 (which may include a processor and some memory as well as peripheral entities), and a power supply 28. A data and control interface 24 may be provided between the communication interface 22 and the data processing unit 23. The sensor station is equipped with one or more sensors 26 for measuring physical parameters (such as sound, light, vibration, magnetic field, infrared emissions) and/or detecting changes in the environment. The sensor station may also be equipped with positioning hardware 27 (for example a GPS receiver) providing location information (such as geographical coordinates), and/or means 29 (i.e. a timing device 29, a clock) for determining and providing time (e.g. clock time, date). The wireless interface 22 employed for data exchange may be based on different communication protocols, such as a radio technology used in wireless local area networks (WLANs) or wireless personal area networks, such as IEEE 802.11 (WiFi), IEEE 802.15.1 (Bluetooth) or IEEE 802.15.4 (ZigBee) technology or UMTS or other wireless communication protocols.

According to one disclosed embodiment the sensor stations are configured to detect changes of physical parameters in the environment 10. At least some of the sensor stations are equipped with sufficient computing power (e.g. data processing unit 23) and configured, using suitable algorithms and methods (e.g. implemented by software running on the data processing unit 23), to autonomously analyze the changes in physical parameters of the environment and to make decisions either autonomously or in collaboration with the other sensor stations, utilizing the information collected and forwarded by at least one of the other sensor stations, about events of interest occurring in the environment (such as an intruder 11 entering the area). An individual sensor station may be configured to transmit appropriate messages to one or more of other sensor stations or to other systems in case certain parameter values, combinations of parameter values or change in parameter values, or any other predetermined triggering event, is observed by the sensor station. Data collected by a group of sensor stations may be exchanged between the sensor stations, and appropriate results can be computed based on the data. The same or other sensor stations may be utilize that information to assess the properties of the intruder (type, level of threat) or other appropriate parameters. The sensor stations may store the collected data in their memory to communicate the data to other sensor stations or to any information consumers 7, such as adjacent or remote data collecting devices, adjacent or remote user devices, or to systems 12 outside the ad hoc network.

When, following the data analysis step, the sensor stations come to the conclusion that an event of interest has occurred in the monitored area—a source of alarm, such as an intruder—one of the sensor stations may transmit information about the event (in the form of a message) using a wireless communication channel to other systems (for example a command centre, adjacent data collecting devices, adjacent user devices, or to systems outside the network), including metadata about the event. The message transmitted by the first sensor station via the ad-hoc network so that other sensor stations could transmit the message using the most appropriate (which depending on the situation could be the shortest, the most reliable or the fastest) path to a base station 8 or 9, which in turn forwards the message to other systems 12 or to the information consumer 7. At least some of the sensor stations may communicate directly with other systems 12 or to the information consumer. For communication with remote (or local) systems, machines, servers, or control centres various wireless (for example GPRS, CDMA, WiFi (IEEE802.11), WiMax (802.16), TETRA, satellite communication) or wired communication methods can be used. Thereby, other autonomous patrol systems or machines can obtain information on the event, such as an intruder, in a rapid and accurate way and are therefore able to react to the events.

Sensor stations may be time and location aware. According to an exemplary embodiment, the sensor station may be equipped with location information, which was determined and stored to the memory of the sensor station during the installation of the sensor station. According to another exemplary embodiment the sensor station may be equipped with positioning hardware 27 (for example a GPS receiver). In a similar manner, the sensor station according to disclosed embodiments may be equipped with means 29 for determining time. As a consequence, the information and queries sent by the sensor stations can be equipped (tagged) with time and location stamps, which allows to assess and monitor the event of interest (e.g. a source of an alarm) using different types of sensors attached to various sensor stations in several locations, and to form a complete view of the properties and movement of the source of an alarm.

According to another disclosed embodiment the sensor stations forward collected information on the monitored area or physical parameters to information consumers, such as a central computer or a command centre, where the parameters are analyzed and, in case of certain parameter values or combinations of parameter values or change in parameter values, an appropriate notification is sent to other information consumers, which could be unmanned vehicles or security patrols that are equipped with appropriate communication interfaces.

The system may be configured in a way where data is communicated to other systems outside the network only when there is need to do so. A decision on whether to communicate or not is made autonomously by the sensor stations based on the analysis of the information collected by the sensor stations.

An advantage of the system according to disclosed embodiments is that the data is processed in a distributed manner. One sensor station may query various parameters from other sensor stations which parameters are used to compute a desired result, the result being computed either by the inquiring sensor station or any other sensor station. For example, a sensor station equipped with a passive infrared sensor may transmit its measurement results, which triggers data acquisition by another sensor station equipped with a vibration sensor. Combining these measurement results a decision could be made to take a picture of the monitored area and the picture may be transmitted with appropriate metadata (including the location of the event) to a monitoring centre or a mobile patrol. All the decisions required for the processes are made by the sensor stations. The network discovers automatically the optimum route for the transmission of data, which could be the shortest, the fastest or most reliable route, for example.

Figure 3:
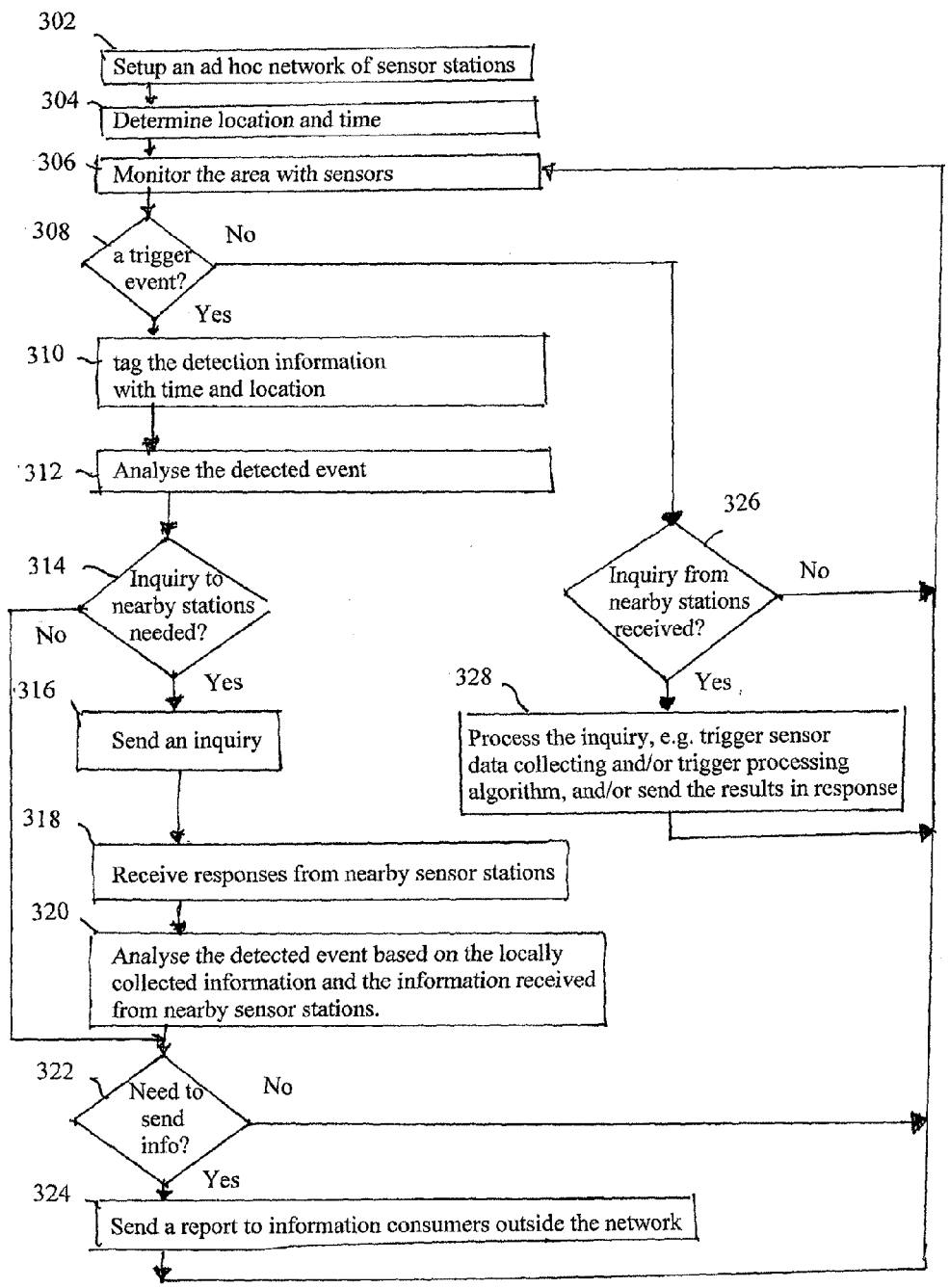
FIG. 3 is a flow diagram illustrating an example of operation of a sensor station according to one disclosed embodiment.

An example of an operation according to disclosed embodiments will be described with reference to FIGS. 1 and 3. The sensor stations 1-5 have setup an ad hoc network (step 302) and determined their time and location (step 304). Let us assume a situation wherein an intruder 11 crosses a periphery 10 of the monitored area. The sensor stations 1-5 are configured to monitor and detect changes of physical parameters in the environment 10 (step 306). In step 308, the sensor station 5 checks whether certain parameter values (e.g. by an infrared movement detector), combinations of parameter values or change in parameter values, or any other predetermined triggering event is detected (the detection is depicted by the arrow 13 in FIG. 1). If no trigger event is detected, the process may proceed to step 326. If trigger event is detected, the sensor station 5 tags the detection information with time and location (310), and after analysing the event (step 312) the sensor station 5 decides whether there is need to send inquiries to nearby sensor stations in order to acquire more data for evaluation of the event (step 314). If inquiries are needed, the sensor station 5 sends inquiries 14A-14C to nearby sensor stations 4, 6, and 1, respectively (step 316). If no inquiry is needed, the process may proceed to step 322.

In response to receiving an inquiry, the nearby sensor stations 1, 4 and 6 may operate as illustrated in steps 326 and 328, i.e. they may be triggered to perform information collecting with their sensor and/or to analyse stored historical data in their memories, or to perform any other data collecting or processing procedure or algorithm required by the respective inquiry. In the example case, the sensor station 1 also detects certain parameter values (e.g. by an infrared movement detector), combinations of parameter values or change in parameter values, or any other predetermined triggering event (the detection is depicted by the arrow 15 in FIG. 1). Sensor station 1 tags the detection information with time and location and, possibly after analysing the event, sends the information as a response to the sensor station 5. The sensor stations 4 and 5 do not detect any event, and they may either send a response message indicating that there is no data to send (after analysing the collected data), or send no response at all, or send processed or raw data to the inquiring sensor station 5.

The sensor station 5 receives responses from the nearby stations (step 318). Then the sensor station 5 analyses the data collected from it self and the data received from other sensor stations 1, 4 and 6 in order to evaluate the event (step 320). The analysis may require further data collection inquiries to other sensor stations, or inquiries to other sensor stations to perform processing algorithms for distributing the processing required. Based on the evaluation, the sensor station 5 alone, or several sensor stations collaboratively decide(s) whether the event shall be reported or not (step 322). For example, the conclusion may be that an intruder is moving inside the monitored area with a certain speed and in a certain direction, and therefore the event shall be reported. The event report may be transmitted with appropriate metadata (including the time and location of the event) in step 324. The network discovers automatically the optimum route for the transmission of data, which could be the shortest, the fastest or most reliable route, for example. In the example depicted in FIG. 1, the message sent by the sensor station is routed via the sensor stations 2 and 3 to the base station 9 (the message path is depicted by the arrow 16), and further to information consumers 7, such as a command centre, or any other system 12 outside the network. The information consumers 7 may also be adjacent data collecting devices, adjacent user devices, unmanned vehicles or security patrols that are equipped with appropriate communication interfaces such that they are able to receive messages from the sensor stations either directly (as indicated by the arrow 17), via base stations (as indicated by arrows 18), or via other communication systems. After sending the information to information consumers, the process returns to monitor the area in step 306. Also, in the case the decision in step 322 is to not send a report, the event may be ignored and the process may return to monitor the area in step 306.

The system may also be used for monitoring the environmental conditions in a specific area. Sensor stations equipped with sensors with different modalities (with the sensor configurations being heterogeneous across sensor stations) are placed in the monitored area. Sensor stations either may determine their locations automatically using means of positioning or the locations of sensor stations may be determined by external means and communicated to individual sensor stations. After the sensor stations have been deployed and their locations have been determined they are able to provide sensor data supplemented with temporal and spatial information. The sensor data can be pre-processed at a sensor station before it is sent out (using for example statistical data processing methods).

Determining the condition of the environment in a specific location in the monitored area may require the aggregation of data from sensors with different modalities located in the same area. These sensors may be part of distinct sensor stations. For that purpose of data aggregation the data from these distinct sensor stations must be collected and processed. The aggregation may be performed on one of the sensor stations that generated the entire source data or part of the source data, or the aggregation may be performed on a further sensor station that did not participate in the source data generation. The roles of the sensor stations may be determined at runtime, depending on the availability of algorithms, processing power and/or energy at a sensor station. A sensor station in a specific location may not acquire process and store the data from a specific sensor if the data has not been requested. A sensor data conditioning or aggregation algorithm may be executed only if the execution of such an algorithm has been requested.

From the perspective of the sensor station it does not make a difference if the data is requested by a server, another sensor station or any other type of information consumer.

The roles of the sensor stations may not be fixed in a specific application. To the opposite, the sensor stations may assume different roles based on the requirements of the application and the availability of resources. The sensor stations may execute different algorithms based on the requirements of the application or the requirements of other nodes. The data processing algorithms in a sensor station may be also updated during the operation of the sensor station. For example, one sensor station may request another sensor station to execute a specific algorithm which may be a data aggregation algorithm or some other type of algorithm.

It will be obvious to a person skilled in the art that, the invention and its disclosed embodiments are not limited to the example embodiments disclosed above but the inventive concept can be implemented in various ways and modified and varied within the spirit and scope of the appended claims.

The invention claimed is:

1. A method, comprising:
    setting up an ad-hoc network of wireless sensor stations to monitor an area, wherein at least some of the sensor stations comprise one or more sensors suitable for monitoring one or more physical parameters of interest,
    collecting information using said sensors;
    providing the collected information with spatial and temporal information;
    processing the collected information using appropriate distributed computational algorithms such that at least two nearby sensor stations exchange information with each other and at least one of the sensor stations provides distributed processing to at least one other nearby sensor station in response to an inquiry in said ad-hoc network to evaluate the situation in a specific location at a specific moment in time employing combined information of said at least two nearby sensor stations in the area, including said spatial and temporal information;
    determining roles of the sensor stations in the information collecting and the distributed processing at runtime by sensor stations themselves according to the data requests made to the network and the capabilities, locations and properties of the sensor stations; and
    transmitting, if required based on the evaluation, information on the situation via said ad-hoc network to information consumers.

2. The method of claim 1, further comprising:
    at least one of the sensor stations inquiring information and/or distributed processing from at least one other nearby sensor station in response to a predetermined triggering event.

3. The method of claim 1, further comprising:
    at least one of the sensor stations sending information and/or providing distributed processing to at least one other nearby sensor station in response to a predetermined triggering event.

4. The method of claim 1, further comprising:
    determining the roles of the sensor stations in the information collecting and the distributed processing at runtime, depending on the availability of algorithms, the availability of processing power, the availability of energy, the requirements of the application, the properties of sensor stations and/or requirements of other sensor stations.

5. The method of claim 1, further comprising:
    a sensor station executing a specific distributed processing algorithm or a specific information collecting task in response to a specific request from another node.

6. The method of claim 1, further comprising:
    updating the processing algorithms of a sensor station during operation of the sensor station via the ad-hoc network.

7. The method of claim 1, further comprising:
    transmitting only collaboratively processed information or decisions to the information consumers outside the ad-hoc network.

8. The method of claim 1, further comprising:
    transmitting information to the information consumers outside the ad-hoc network, when a decision to transmit information has been made by at least one of the sensor station as a result of evaluating information collected by at least two sensor stations.

9. The method of claim 1, further comprising:
    transmitting information to the information consumers, when a decision to transmit information has been made by more than one of the sensor stations, based on the information collected, processed and forwarded by said more than one sensor stations and possibly other sensor stations in the area.

10. The method of claim 1, further comprising:
    at least one sensor stations querying, processing and analyzing information collected and processed by at least one nearby sensor station,
    at least one sensor station assessing the situation in a certain area at a certain time employing information collected locally and information collected by other sensor stations,
    at least one sensor station tagging the queries and information with temporal and spatial information for monitoring and evaluating the source of an event in the location of sensors at various locations and with various modalities, and
    a sensor station evaluating the situation in a specific location at a specific moment in time, employing the information collected by the sensor station itself and by other sensor stations in the area.

11. The method of claim 1, wherein the information consumers include one or more of the following: a command centre, a patrol system, a security centre, a data processing centre, a mobile user terminal, a control room of a plant, a maintenance system of a plant.

12. A system, comprising:
- an ad-hoc network of wireless sensor stations set up to monitor an area,
- each of the sensor stations including a processor unit, a wireless communication unit and one or more sensors suitable for monitoring and collecting sensor information regarding one or more physical parameters of interest, the collected sensor information being provided with spatial and temporal information;
- the processor units of the sensor stations processing the collected sensor information using appropriate distributed computational algorithms to evaluate the situation in a specific location at a specific moment in time employing combined sensor information of at least two nearby sensor stations in the area, including said spatial and temporal information;
- the processor units of the sensor stations being configured to determine roles of the sensor stations in the information collecting and the distributed processing at runtime based on data requests made to the network and the capabilities, locations and properties of the sensor stations; and
- the sensor stations being configured to transmit, if required based on the evaluation, information on the situation via said ad-hoc network to information consumers.

13. A sensor station, comprising one or more sensors suitable for monitoring one or more physical parameters of interest, a wireless communication module, a computing unit, and a memory for storing data, wherein
- said sensor station is configured to set up an ad-hoc network with a plurality of other similar sensor stations to monitor an area and to collect sensor information provided with spatial and temporal information;
- the computing unit of the sensor station processing the collected sensor information in collaboration with the other sensor stations using appropriate distributed computational algorithms to evaluate the situation in a specific location at a specific moment in time employing combined information of the sensor station and the at least one nearby sensor station in the area, including said spatial and temporal information;
- the computing unit of the sensor station determining the role of the sensor station in the information collecting and the distributed processing at runtime based on data requests, capabilities, locations and properties of the other sensor stations.

* * * * *